Sept. 10, 1940. W. J. SIMONDS Re. 21,564

PIPE BODY STAINLESS REEL

Original Filed July 7, 1938

Inventor
Warren J. Simonds
By attorney

Reissued Sept. 10, 1940

Re. 21,564

UNITED STATES PATENT OFFICE 21,564

PIPE BODY STAINLESS REEL

Warren J. Simonds, Orange, Mass., assignor to Rodney Hunt Machine Company, Orange, Mass., a corporation of Massachusetts Original No. 2,174,763, dated October 3, 1939, Serial No. 217,969, July 7, 1938. Application for reissue March 22, 1940, Serial No. 325,476

5 Claims. (Cl. 242—123)

This invention relates to a stainless steel reel and is a further improvement on the reel set forth in my Patent No. 2,071,090.

While that reel served its purpose, the principal object of this invention is to provide for practically the same results with a very material addition to the strength at a decidedly lower cost in the manufacture as well as maintenance.

Other objects of the invention are to provide a stainless steel cover for an ordinary pipe body, the cover being made of comparatively thin stainless steel and protecting the pipe body so that the strength will be secured through the pipe body and the protection through the cover; to provide means whereby the longitudinal bars can be accurately and fixedly supported by the pipe and still protect the pipe against the admission of liquids in washing or dyeing.

Other objects and advantages of the invention will appear hereinafter.

Reference is to be had to the accompanying drawing, in which

In the reel set forth in the above mentioned patent, certain desired results were secured but it involved considerable expense for the weight of the stainless steel required and it also was a comparatively heavy construction. With the idea of reducing the cost of manufacture and very much improving the strength of a reel for accomplishing the same objects this invention has been evolved.

The strength is greatly increased and the cost reduced by mounting the whole reel on an ordinary steel pipe 10 which constitutes the shaft of the reel and does not even have to be finished on the outside. This constitutes one of the savings. By using an ordinary steel pipe the cost of the shaft is reduced and a shaft is provided having a great deal of strength against bending as well as against twisting.

In order to cover the pipe, two or more sheets 11 of stainless steel are formed and united together and then used as a jacket around the body of the pipe 10. This protects the pipe from the liquids and alkalies used in certain technical operations for which this reel is employed.

Figure 1:
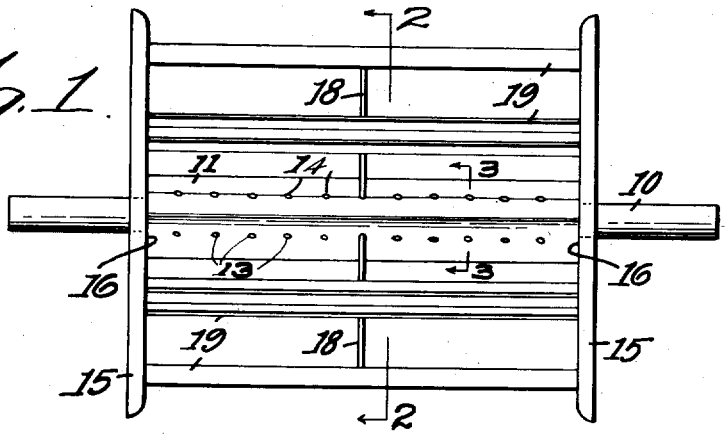
Fig. 1 is a side view of a stainless steel reel used in the textile industry for washing or dyeing purposes in connection with yarn or cuts of cloth.
Figure 2:
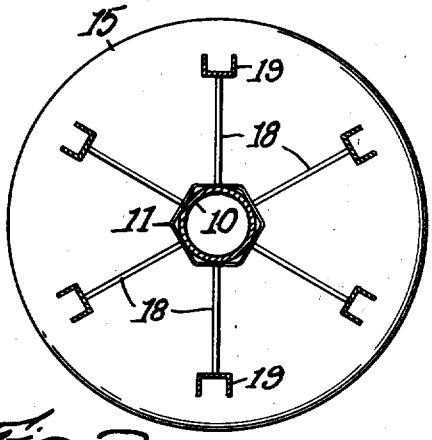
Fig. 2 is a sectional view on the line 2—2 of Fig. 1.
Figure 3:
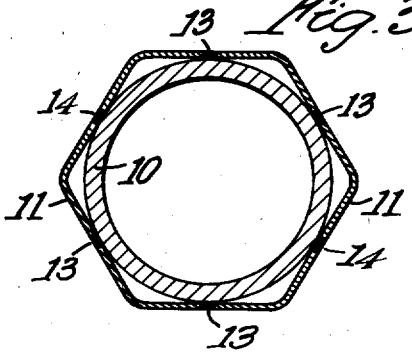
Fig. 3 is a sectional view on the line 3—3 of Fig. 1.
Figure 4:
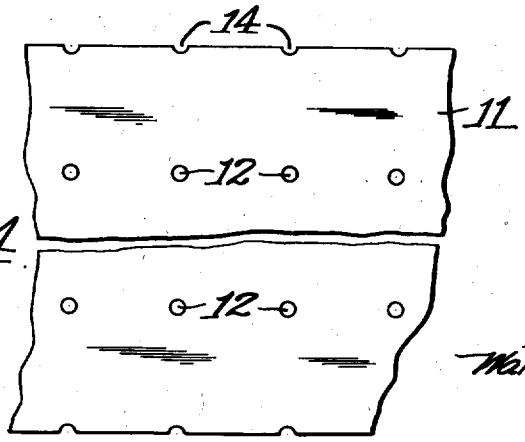
Fig. 4 is a view of a piece of the stainless steel intended for wrapping half way around the shaft in its straight condition before it is bent around the shaft.

Preferably two sheets, as shown in Fig. 4, are employed. These are provided with punched holes 12 through which the sheets can be welded, or otherwise united, with the pipe 10 at the points 13. At the two edges of the sheets 11 are half holes 14 which register with each other as the two sheets surround the pipe body to serve as a means for receiving the weld, or the like, for uniting the two sheets together wherever these joints may occur. The holes thus formed by the notches 14 take the place of the holes 12 along the seams. As a matter of fact, the holes are intended to occur at points where the sheets rest against the pipe 10. The sheets are welded together throughout their length, edge to edge, and united to the pipe at spaced points. The holes 12 and the holes formed by the notches locate the points 13 at which the cover is welded to the pipe. The whole structure of the sheet cover is shown as hexagonal, thus bringing these points against the cylindrical pipe where they can be united in this way.

The rest of the reel, of course, is composed in the present case of six radial posts 18 reaching to the pipe and supported thereby. These posts carry six U-bars 19 extending longitudinally secured to the end discs 15 but, of course, not protected in any way by the stainless steel. On longer reels only are the posts 18 employed.

The end heads 15 of the reel are brought up tight against the sides of the jacketed pipe body and are welded to the stainless steel along the line 16. This provides a reel that is entirely stainless as it is sealed throughout against the entrance of moisture, alkalies or acids.

By this multiplicity of holes and two seams, the seams being provided with half holes at regular intervals, the stainless steel jacket becomes a unit with the body providing tremendous strength. At the same time the finished surface is of stainless steel throughout its areas with no part anywhere exposed to cause trouble from rust, or the like.

It will be seen, therefore, that great increase in strength is provided and a decrease in the amount of stainless steel, which is an expensive metal. The interior parts are thoroughly protected against the rust.

Having thus described my invention and the advantages thereof, I do not wish to be limited to the details herein disclosed, otherwise than as set forth in the claims, but what I claim is:

1. In a reel of the character described, the combination of a steel pipe constituting the center of the reel and the shaft on which it turns, a jacket around the shaft of polygonal shape consisting entirely of stainless steel and extending from one end to the other, said jacket extending entirely around the pipe and being welded to the surface of the pipe at intervals around it and at intervals along it, end discs constituting the ends of the reel welded to the ends of said jacket, and bars extending from one disc to the other at a distance from the pipe.

2. As an article of manufacture, a reel for the purpose described, comprising a steel pipe constituting an axle thereof, a pair of sheets of stainless steel forming a cover for the pipe and provided with peripheral semicircular notches at the edges of each sheet and spaced to come together at their edges, said sheets to engage the pipe at their edges and at points therearound, said edges being welded together throughout their length, perforations in the stainless steel located at points at which the stainless steel engages the pipe, welding material in said perforations and notches for securing the sealed stainless steel cover around the pipe to prevent the entrance of liquids, two end discs welded to opposite ends of the cover around the pipe and bars extending across from one disc to the other.

3. In a reel of the character described, the combination of a steel pipe constituting the center of the reel and the shaft on which it turns, a jacket around the shaft of polygonal shape consising entirely of stainless steel and extending from one end to the other, said jacket extending entirely around the pipe and being welded to the surface of the pipe at intervals around it and at intervals along it, and end discs constituting the ends of the reel welded to the ends of said jacket.

4. As an article of manufacture, a reel for the purpose described, comprising a steel pipe constituting an axle thereof, a pair of sheets of stainless steel forming a cover for the pipe and provided with peripheral semicircular notches at the edges of each sheet and spaced to come together at their edges, said sheets to engage the pipe at their edges and at points therearound, said edges being welded together throughout their length, perforations in the stainless steel located at points at which the stainless steel engages the pipe, welding material in said perforations and notches for securing the sealed stainless steel cover around the pipe to prevent the entrance of liquids, and two end discs welded to opposite ends of the cover around the pipe.

5. As an article of manufacture, a reel for the purpose described, comprising a pipe constituting an axle for said reel, a jacket of stainless steel about said pipe, said jacket being polygonal in cross-section to present a noncircular form about said pipe, said jacket extending entirely around said pipe and being secured to the surface thereof at intervals therearound and therealong, and end discs constituting the ends of the reel and secured to the ends of said jacket.

WARREN J. SIMONDS.